United States Patent [19]

Laycock

[11] 4,363,054

[45] Dec. 7, 1982

[54] APPARATUS AND METHOD FOR OSCILLATING THE TAPE OF A TAPE PLAYER

[76] Inventor: Ralph G. Laycock, 508 E. 600 South, Orem, Utah 84057

[21] Appl. No.: 146,487

[22] Filed: May 5, 1980

[51] Int. Cl.³ .................... G11B 15/18; G11B 15/00
[52] U.S. Cl. ............................ 360/72.1; 360/72.2; 360/74.1; 360/95
[58] Field of Search ............... 360/13, 8, 72.1, 72.2, 360/74.1, 90, 93, 96.1, 52, 95

[56] References Cited

U.S. PATENT DOCUMENTS

| | | | |
|---|---|---|---|
| 3,434,724 | 3/1969 | Palmer | 360/90 |
| 3,550,984 | 12/1970 | Moore | 360/90 |
| 3,898,691 | 8/1975 | Nakauchi et al. | 360/52 |

*Primary Examiner*—Vincent P. Canney
*Attorney, Agent, or Firm*—Thorpe, North & Western

[57] ABSTRACT

Apparatus and method for causing the tape of an audio tape player to oscillate at the point of contact of the tape with the read head of the tape player. The apparatus includes first and second guide members disposed on either side of the read head at locations where the tape may be placed in contact with and about the guide members. The first guide member is mounted on a support member which is arranged to move in an oscillatory manner generally toward and away from the read head. The support member is caused to oscillate by a camming structure which, in turn, is driven by a variable speed motor. The second guide member is mounted on one end of a resilient element, the other end of which is fixed. This resilient element biases the second guide member against the tape to maintain the tape in a taut condition at the point of contact of the tape with the read head. When the support structure is caused to oscillate, the first guide member also oscillates to thereby cause the tape to oscillate. Such oscillation is useful for enabling the location of particular sounds on a tape and this, in turn, facilitates editing and splicing together segments of a musical composition.

7 Claims, 2 Drawing Figures 4,363,054

APPARATUS AND METHOD FOR OSCILLATING THE TAPE OF A TAPE PLAYER

BACKGROUND OF THE INVENTION

This invention relates to a system for causing the tape of a tape player to oscillate longitudinally at the point at which the tape passes the tape player read head to thereby facilitate tape editing and the like.

It is well known that in the course of recording music on tape, oftentimes it is not possible to record a complete composition satisfactorily in one so-called continuous "take". Rather, portions or segments of the composition must be recorded separately (and possibly more than once), evaluated, and then the best portions selected for splicing together to form what hopefully will have the sound of a single continuous recording of the entire composition.

Selection of the different portions of the composition to be spliced together heretofore has been done by listening to each portion until the approximate location for cutting the tape is determined. This location in one selected portion of the composition must match as closely as possible the location in the next adjacent selected portion so that when spliced together, the splice will not be noticeable when the tape is played. When the approximate location for splicing a tape is determined, the tape is stopped and then the tape reels are manually rotated back and forth to thereby move the tape back and forth across the playback or read head. The purpose of this is to find the precise location were the tape is to be marked and cut. After determining two such corresponding locations in two recorded portions of the composition, the tape is cut in both locations and the two selected portions are spliced together. The above described process is referred to as "editing" and the splice locations are called "edits".

In order to locate specific points in a musical composition, the person editing the tapes must listen for certain sounds. Of course, the pitch of any sound is changed when the speed of movement of the tape containing the sound is changed. Thus, precise location of a particular sound is facilitated if the editor can manually move the tape at a constant speed to maintain constancy of the pitch. This is difficult to do since movement of the tape is carried out manually by rotating the tape reels. If the tape movement is slowed in an attempt to "zero in" on a desired sound or note, the pitch may be lowered and the sound intensity weakened to the point where the sound is barely audible. All of these problems complicate the finding of precise splicing locations on a tape, and prolong and make tedious the editing process.

SUMMARY OF THE INVENTION

It is an object of the invention to provide a simple and inexpensive system for producing longitudinal oscillatory movement in an audio or other type of tape at the point of contact of the tape with the read head of a tape player.

It is another object of the invention to provide such a system in which the tape oscillation may be produced automatically and at uniform frequencies.

It is a further object of the invention to provide such a system in which the frequency of oscillation of the tape may be varied.

It is still another object of the invention to provide such a system in which the amplitude of oscillation of the tape may be varied.

It is also an object of the invention to provide a system which may be readily employed with a conventional tape player for causing oscillation of the tape at the point of contact with the tape player's read head.

The above and other objects of the invention are realized in a specific illustrative embodiment of a system adapted for use in combination with an audio tape player capable of reproducing sounds recorded on a tape when the tape is moved past the tape player's playback or read head. The system includes a support member which is movable in a reciprocating or oscillatory manner, and a guide member disposed on the support member in a position to allow placement of the tape player's tape in contact with and about at least a portion of the guide member such that when the support member oscillates, the guide member also oscillates to thereby cause the tape to oscillate longitudinally at the point of contact with the read head. Also included is a motor drive for automatically causing the support member to oscillate at a substantially uniform rate. In accordance with one aspect of the invention, the speed of the motor drive may be varied to thereby vary the frequency of oscillation of the support member. Also, the motor drive may be adjusted to vary the amplitude of oscillation of the support member and thus of the tape.

Automatic and uniform oscillation of the tape at the read head results in production of sounds of fairly constant pitch for corresponding segments of a musical composition and this greatly facilitates precise location of desired edit points on a tape. In addition, the frequency and amplitude of oscillation may be varied as desired to further aid the finding of desired edit points.

BRIEF DESCRIPTION OF THE DRAWINGS

The above and other objects, features and advantages of the invention will become apparent from a consideration of the following detailed description presented in connection with the accompanying drawings in which.

DETAILED DESCRIPTION

Figure 1:
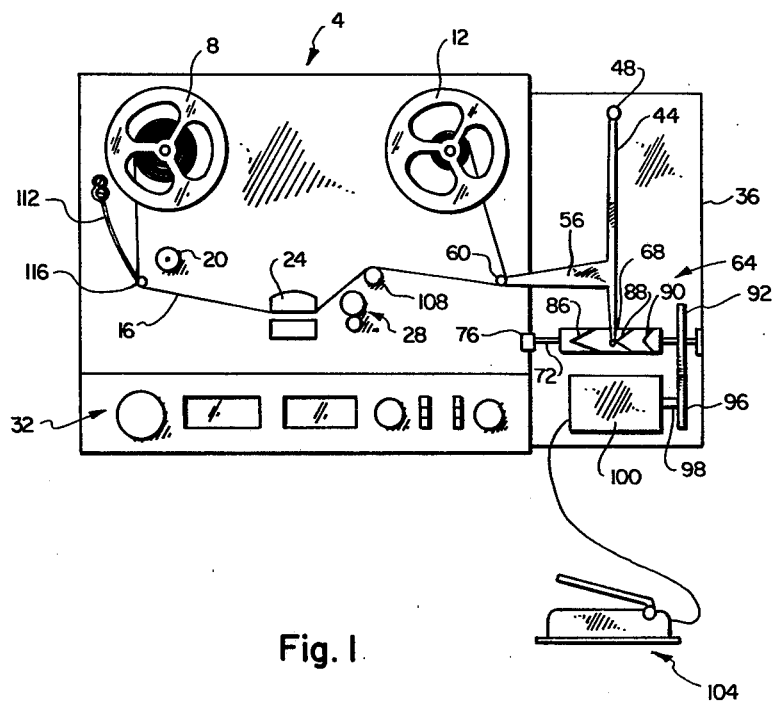
FIG. 1 is a top plan view of a conventional audio tape player and apparatus made in accordance with the principles of the present invention.
Figure 2:
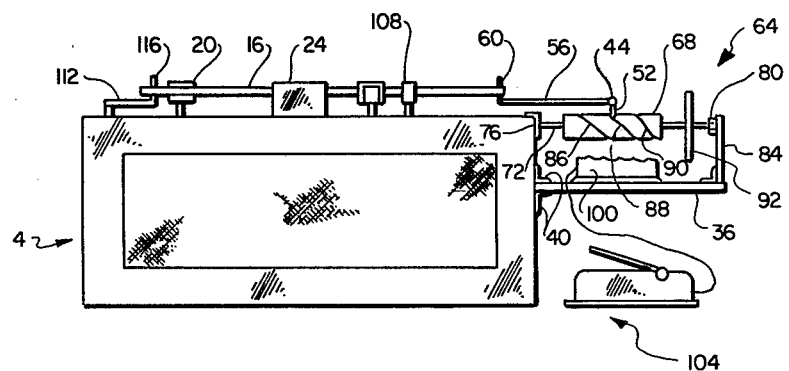
FIG. 2 is a front elevational view of the tape player and apparatus of FIG. 1.

Referring to FIGS. 1 and 2, there is shown a top and a front elevational view respectively of a conventional audio tape player 4. The tape player includes tape reels 8 and 12 (shown only in FIG. 1) on which is wound an audio tape 16. Mechanisms are included in the tape player 4 for controlling rotation of the reels 8 and 12 to allow both forward movement and rewinding of the tape 16 in the conventional manner.

The tape player 4 also includes a pulley 20 for guiding the tape 16 when the tape player is used in its normal operation, a playback or read mechanism 24 which includes a playback or read head for reading sound information recorded on the tape, and a capstan drive mechanism 28 which is used to move the tape at a substantially uniform speed when "playing" a tape. A control panel 32, having appropriate control knobs and switches, is provided with the tape player 4 to allow control of sound volume, tape rewind, "fast forward", playback of the tape, etc. All of these elements and features are conventional to most currently available tape players and do not form any part of the present invention.

The system of the present invention is adapted for use in combination with a conventional tape player such as tape player 4 of FIGS. 1 and 2. Most of the system components are mounted on a support platform 36 which, in turn, is mounted by brackets 40 to one side of the tape player 4. An elongate support arm 44 is mounted on the platform 36 to pivot about a pivot axis 48 located at one end of the arm. The other end of the arm includes a downwardly extending finger element 52 whose function will be described momentarily. Extending laterally of the arm 44 is another arm 56 on the end of which is an upwardly extending finger guide 60.

Also mounted on the platform 36 is a camming mechanism 64. The camming mechanism includes a cylinder 68 mounted on an axle 72 to rotate about its cylindrical axis. A hub 76 is mounted on one side of the tape player 4 to hold one end of the axle 72, and another hub 80 is mounted on a brace 84 extending upwardly from the platform 36 to hold the other end of the axle 72. Formed in the exterior surface of the cylinder 68 are three camming raceways (grooves) 86, 88 and 90. The finger element 52 is fitted into a selected one of the raceways and is guided to oscillate back and forth as the cylinder 68 is rotated to thus cause the arm 44 to oscillate. This, of course, causes the finger guide 60 to also oscillate. The particular raceway selected is dependent upon the desired amplitude of oscillation of the arm 44. For example raceway 86 has the largest channels, as can be seen in the drawings, and thus provides the greatest amplitude of oscillation, whereas raceway 90 has the shortest channels and thus provides the smallest amplitude of oscillation. The raceways 86, 88 and 90 are formed in a conventional manner in the cylinder 68 to guide the finger element 52 in a back and forth motion at a substantially constant speed as the finger element is carried in the selected raceway.

Disposed on the axle 72 of the camming mechanism 64 is a driven wheel 92. Maintained in contact with the rim of the driven wheel is a driving wheel 96 which is mounted on the drive shaft 98 of a variable speed electric motor 100. The motor 100 is mounted on the platform 36 (only the lower portion of the motor 100 is shown in FIG. 2 so that the camming mechanism 64 can be fully seen). As the driving wheel 96 is rotated, it causes the driven wheel 92 to rotate, and this, in turn, causes the cylinder 68 to rotate. The wheels 92 and 96 are selected so that suitable friction engagement may be maintained between the two wheels to cause the driven wheel 92 to rotate when the driving wheel 96 is rotated. A speed control unit 104 is coupled to the motor 100 to control the speed of rotation of the motor drive shaft 98. Controlling the speed of the motor 100, in turn, controls the frequency of oscillation of the support arm 44 and thus of the tape 16.

Disposed on the tape player 4 is a post 108 positioned generally between the read mechanism 24 and the finger guide 60 so that when the tape 16 is placed about the post, it bypasses the capstan drive mechanism 28. This is best seen in FIG. 1. Of course, if it were desired to thread the tape 16 through the capstan drive mechanism 28 and then about the finger guide 60, this could readily be done. This might be desirable in the tape players where it were possible to disengage the capstan drive mechanism while maintaining the read mechanism activated. In tape players where the read mechanism could only be activated when the capstan drive mechanism were engaged, then the post 108 would be used to bypass the capstan drive mechanism. This is necessary since the tape 16 could not be readily oscillated if threaded through the capstan drive mechanism 28 while it was engaged.

Disposed on the other side of the read mechanism 24 and mounted on the tape player 4 is an elongate resilient rod 112. One end of the rod 112 is fixed to the tape player 4. The other end of the rod includes an upwardly extending finger guide 116. The rod 112 is positioned so that when the tape 16 is threaded about the finger guide 116, the rod will urge the tape leftwardly to maintain the tape taut against the read mechanism 24. Also, the end of the rod 112 which supports the finger guide 116 is adapted to move back and forth generally toward and away from the read mechanism 24.

An exemplary method of using the system of the present invention for editing a musical composition is as follows. The tape 16 containing separately recorded portions of the composition is played on the tape player 4 in the normal fashion until the approximate location on the tape of a desired sound is determined. Then, the tape 16 is threaded about the finger guide 116 past the read mechanism 24 and from there (assuming that the capstan drive mechanism 28 cannot be disengaged without deactivating the read mechanism) to the post 108 and about the finger guide 60 back to the reel 12. The tape is then positioned so that the approximate location of the desired sound is adjacent to the read mechanism 24. This is done by simply manually rotating the reels 8 and 12. The motor 100 is then operated to cause rotation of the cylinder 68 which, in turn, causes the arm 44 and the finger guide 60 to oscillate back and forth generally toward and away from the read mechanism 24. When the finger guide 60 is moved to the right, it will pull against the tape 16 and cause it to move to the right and this, in turn, will cause the rod 112 to flex to the right. When the finger guide 60 thereafter moves to the left, the rod 112, being resilient, moves to the left to thereby pull the tape to the left. This action repeats to produce an oscillatory movement of the tape 116 past the read mechanism 24. In this manner, a substantially uniform and steady rate of oscillation is achieved. Such oscillation yields an almost continuous playback of a desired small segment of tape and thus almost a continuous maintenance of the sound located at that segment. To change the segment on the tape being oscillated at the read head, reels 8 and 12 are simply moved by hand to cause the tape to move generally to the left or the right. In this manner particular sounds or points on the tape (representing for example a fraction of a second) can be readily located for splicing purposes or otherwise.

The amplitude of oscillation of the tape, as before indicated, can be selected by simply selecting an appropriate one of the raceways 86, 88 and 90 into which the finger element 52 is to be placed. A larger amplitude will result in a longer length segment of the tape being oscillated past the read mechanism 24 whereas a smaller amplitude of oscillation will result in a shorter length segment being oscillated past the read mechanism. The pitch of the reproduced sound is controlled by controlling the speed of operation of the motor 100, and the sound intensity of the reproduced sound can be controlled using the standard volume control found on the tape player 4.

In the manner described, a simple system is provided for causing the tape of a tape player to oscillate at the point of contact of the tape with the read mechanism.

Such oscillation enables an operator to more accurately and with greater speed locate desired splicing or editing points on the tape. It should be understood that the apparatus and method described are only illustrative of the principles of the present invention and that numerous other arrangements could be suggested by those skilled in the art without departing from the spirit and scope of the invention. For example, there are numerous ways of causing the finger guide 60 to oscillate including all those which convert rotary motion into reciprocating motion. Also, other arrangements could be provided for maintaining tautness of the tape in addition to the use of the resilient rod 112 described above. Various other spring shapes, for example, could be utilized in place of the resilient rod 112. The platform 36 could also be constructed to be separate from the tape player 4 so that, for example, the tape player would rest upon and hold in place the platform, but not be attached thereto.

What is claimed is:

1. Tape oscillating apparatus for use in combination with a tape player adapted to reproduce sounds recorded on tapes when the tapes are moved past the tape player's playback head, said apparatus comprising
    first support means located on one side of the playback head and mounted to move in an oscillatory fashion,
    first guide means disposed on the first support means in a position to allow the tape of the tape player to continuously contact and extend about a portion of the guide means,
    drive means for causing said first support means and first guide means to repetitively oscillate in a continuous fashion to thereby alternately pull the tape in one direction past the playback head and allow return of the tape in the other direction to thus cause the tape to repetitively and continuously oscillate longitudinally at the playback head,
    second movable support means located on the other side of said playback head and including a resilient element biased to return to a rest position when moved from such position, and
    second guide means disposed on said second support means in a position to allow the tape to continuously contact and extend about a portion of the guide means so that when the tape is pulled by the first guide means in said one direction the second guide means maintains a tautness of the tape while alternately allowing movement of the tape in said one direction and causing the tape to return in the other direction.

2. Apparatus as in claim 1 wherein said second support means comprises an elongate resilient member one end of which is fixed, and the other end of which supports the second guide means, said member being disposed so that said other end thereof is movable generally toward and away from the playback head.

3. Apparatus as in claim 2 wherein said second guide means comprises an upstanding finger about which the tape is threaded.

4. Tape oscillating apparatus for use in combination with a tape player adapted to reproduce sounds recorded on tapes when the tapes are moved past the tape player's playback head, said apparatus comprising
    first support means located on one side of the playback and mounted to move in an oscillatory fashion,
    first guide means disposed on the first support means in a position to allow the tape of the tape player to contact and extend about a portion of the guide means,
    wherein said first support means comprises an elongate member mounted to pivot at one end thereof, the other end including a finger element, said first guide means being disposed on said other end of the elongate member,
    drive means for causing first support means and first guide means to oscillate to thereby cause the tape to oscillate longitudinally at the playback head,
    second movable support means located on the other side of said playback head and biased to return to a rest position when moved from such position,
    second guide means disposed on said second support means in a position to allow the tape to contact and extend about a portion of the second guide means so that when the tape is oscillated by the first guide means, the second guide means maintains the tautness of the tape while oscillating in synchronism therewith, and
    wherein said drive means comprises
        cylinder means having a camming raceway formed in the exterior wall thereof for receiving and guiding said finger element, said cylinder means being mounted to rotate about its cylindrical axis so that when rotated, the finger element is guided to oscillate back and forth to thereby cause said elongate member to oscillate, and
        motor means coupled to said cylinder means to cause said cylinder means to rotate.

5. Apparatus as in claim 4 wherein said motor means comprises a variable speed motor including a manually operable speed control means for varying the speed of the motor.

6. Apparatus as in claim 4 wherein said cylinder means includes a plurality of camming raceways formed in the exterior wall thereof, each raceway having a different length to thereby provide a different amplitude of oscillation of said elongate member.

7. Apparatus as in claim 1 wherein the tape player includes a capstan drive mechanism disposed between the playback head and the first guide means, said apparatus further including stationary guide means disposed between the playback head and the first guide means for guiding the tape to bypass the capstan drive mechanism.

* * * * *